United States Patent [19]

Gielis et al.

[11] Patent Number: 4,538,285

[45] Date of Patent: Aug. 27, 1985

[54] FM-RECEIVER FOR RECEIVING FM-SIGNALS WITH TRANSMISSION IDENTIFICATION

[75] Inventors: Gerardus C. M. Gielis; Antoon M. M. Van Kessel, both of Eindhoven, Netherlands

[73] Assignee: U.S. Philips Corporation, New York, N.Y.

[21] Appl. No.: 472,375

[22] Filed: Mar. 3, 1983

[30] Foreign Application Priority Data

Mar. 15, 1982 [NL] Netherlands ........................ 8201056

[51] Int. Cl.[3] .......................... H04B 1/10; H04B 1/32

[52] U.S. Cl. .................................... 375/104; 375/108; 375/114; 375/116; 358/314; 371/41; 371/42; 371/69

[58] Field of Search ................. 375/108, 114, 116, 99, 375/104; 455/222, 223; 358/314; 371/31, 38, 41, 42, 69

[56] References Cited

U.S. PATENT DOCUMENTS 4,326,297 4/1982 Sato et al. .......................... 455/222

4,361,896 11/1982 Garner ................................. 375/96

*Primary Examiner*—Marc E. Bookbinder

*Assistant Examiner*—Raymond C. Glenny

*Attorney, Agent, or Firm*—Thomas A. Briody; William J. Streeter

[57] ABSTRACT

FM-receiver for receiving an FM-signal with transmission identification. An aerial input is connected to a tuning unit (1) to which there are connected, in succession, an IF-unit (2), an FM-detection circuit (3), a pilot regeneration circuit (10) for regenerating a pilot, a demodulation arrangement (12) for demodulating the code signal which contains transmission identification information, and a clock regeneration circuit (18) which is connected to both the pilot regeneration circuit (10) and the demodulation arrangement (12). The clock regeneration circuit comprises a resettable phase search circuit (18') for producing a clock signal whose frequency is derived from the regenerated pilot and whose phase is derived from the demodulated code signal, a clock-controlled decoding circuit (13) for decoding the code signal and a clock-controlled signal processing unit (17). For the purpose of stabilizing the processing, for example, for the reproduction of the transmission identification information, more specifically with mobile reception, use is made, in the event of disturbances of the code signal, of correctly decoded bits which were stored during undisturbed reception in a memory circuit (15). Only in the event of extreme interferences the phase search circuit (18') of the clock regeneration circuit (18) and also the other clock-controlled circuits (13–17) are reset to correct a possible phase slip of the clock signal.

7 Claims, 3 Drawing Figures

FM-RECEIVER FOR RECEIVING FM-SIGNALS WITH TRANSMISSION IDENTIFICATION

BACKGROUND OF THE INVENTION

The invention relates to an FM-receiver for receiving an FM-signal with transmission identification. An aerial input is connected to a tuning unit to which there are connected, in succession, an IF unit, an FM-detection circuit, a pilot regeneration circuit, a demodulation arrangement for demodulating a code signal which comprises transmission identification information. A clock regeneration circuit is connected to both the pilot regeneration circuit and the demodulation arrangement and comprises a resettable phase search circuit for producing a clock signal the frequency of which is derived from a regenerated pilot frequency and the phase of which is derived from the demodulated code signal to provide clock-controlled decoding circuit for decoding the code signals and a clock-controlled signal processing unit.

Such an FM-receiver is disclosed in Netherlands patent application No. 8000607, which has been laid open to public inspection.

The information for the transmission identification is transmitted in the form of continuously repeated digital code words. The consecutive code words form together a code signal which is binary phase-modulated on what is commonly referred to as a code sub-carrier in the spectrum of an FM-signal. The frequency of this code sub-carrier is in a given, fixed relationship to the frequency of a pilot e.g. the (19 KHz) stereo pilot or the (57 KHz) traffic pilot which is included in the transmitted FM-signal. The frequency of the clock signal with which coding of the code signal has been effected in the transmitter is also in a given relationship to the frequency of this pilot.

In the prior art FM-receiver the first mentioned frequency relationship is employed for stable demodulation of the code signal. The frequency relationship between the clock signal and said pilot is used in association with the demodulated binary code signal for an accurate frequency and phase synchronization of the regenerated clock signals and, after synchronization, for a direct coupling of the regenerated clock signal to the pilot. As a result thereof, once a clock signal has been synchronized it has a high degree of stability and is only disturbed in the event of a drop-out or a considerable amplitude reduction of the relevant pilot.

In practice, in certain circumstances, more specifically with mobile reception, disturbances may occur in the received FM-signal which in the prior art FM-receiver result in annoying disturbances in the reproduction of the transmission identification information. The disturbances in the reproduction may have two different causes. They may be the result of a phase derangement or phase-slip of the regenerated clock signals owing to a drop-out or a considerable amplitude reduction in the received pilot during a certain period of time. Disturbances of such a type can be eliminated by resetting the clock regeneration circuit, so that the phase synchronization of the clock signal is recovered by means of the phase search circuit. For that purpose, the prior art FM-receiver has been equipped with a manually operable reset button.

However, the disturbances in the reproduction may also be the result of disturbances of the code signal itself. Since the amplitude of the code sub-carrier in the received FM-signal is much smaller than the amplitude of the pilot, the last-mentioned disturbances are of a much more frequent occurrence than the disturbances owing to a phase-slip of the clock signal.

Although it is possible to reduce to a certain extent the number of errors in the decoded signal by means of an error correction circuit, it has been found in practice and particularly with mobile reception that disturbances of the code signal occur with such a frequency and such a long duration that even after a possible error correction annoying and repeatedly occurring disturbances in the reproduction of the transmission identification cannot be prevented from occurring.

Consequently, with the prior-art FM-receiver the reproduction of the transmission identification is unstable and sensitive to noise, while the majority of disturbances in the reproduction cannot be eliminated by operating the reset button.

SUMMARY OF THE INVENTION

It is an object of the invention to provide an FM-receiver for receiving an FM-signal with transmission identification with a stabilized reproduction and/or other processing of the transmission identification and an automatic recovery of the phase synchronization of the clock signal.

According to the invention, an FM-receiver is characterized by a switchable writing circuit, a memory circuit and a reading circuit, which are arranged between the decoding circuit and the signal processing unit. An interference detection arrangement for measuring interference in the received FM-signal and a control signal generating circuit connected thereto are coupled to a control input of the switchable writing circuit and to a resetting input of the clock regeneration circuit for blocking the writing circuit when interferences of a first level are received and resetting the clock regeneration circuit when interference of a second level are received. The first interference level is lower than the second level and at least substantially equal to the interference level at which noticeable decoding errors occur, and the second interference level is at least substantially equal to the interference level at which a phase slip of the clock signal occurs.

When the invention is used, the interference level of the received FM-signal is measured and used as an indication for the error probability in the decoded code signal owing to disturbances in the code signal itself and the probability of occurrence of a phase slip of the regenerated clock signal owing to disturbances in the received pilot signal.

For interference levels lower than the so-called first interference levels errors are not present in the decoded code signal or in such a small number as to be disregarded and/or they can be eliminated by means of an error correction circuit. The operation of the FM-receiver in accordance with the invention then corresponds to the operation of the prior art FM-receiver.

For interference levels in the received FM-signal which is located between the first and the second interference levels the decoded code signal is noticeably disturbed, even after an eventual error correction, and writing of the code signal into the memory circuit is blocked. However, the phase synchronization of the regenerated clock signal remains uneffected, so that the clock-control signal processing operation, such as for example the optical display of the transmission identification, may continue uninterrupted, use then being made of the code information stored in the memory circuit prior to the relevant disturbances. As a result thereof, the FM-receiver in accordance with the invention continues, in contrast with the prior art FM-receiver, to reproduce or process in a different way correctly without interruption the transmission identification at the occurrence of this type of frequently occurring disturbance.

For interference in the received FM-signal exceeding the second interference level the control signal generation circuit generates a reset signal for the clock regeneration circuit. This results, in contrast with the prior art FM-receiver, in an automatic phase synchronization of the regenerated clock signal without external control.

In a preferred embodiment of an FM-receiver in accordance with the invention, the interference detection arrangement comprises a signal amplitude and multi-path detector, which is connected by an integrator to a threshold circuit which is included in the control signal generation circuit and has first and second threshold voltages which correspond to the first and second interference level, respectively. The integrator output voltage blocks the writing circuit when the first threshold voltage is passed and resetting the clock regeneration circuit when the second threshold voltage is passed.

This measure is based on the recognition of the fact that the extent to which a code signal and/or the pilot is disturbed does not directly depend on the extent of multi-path and magnitude of the signal amplitude or the signal-to-noise ratio of the received FM-signal but does so through a time integral.

The use of the last-mentioned measure in accordance with the invention furnishes, by means of the interference detection arrangement, a true measure of the disturbing effect of both rapidly repeated interference phenomena, such as for example bursts, which are produced by man made noise and interference phenomena of a longer duration, such as, for example, screening by tunnels, a low field strength and multi-path reception in hilly country etc. An adequate, and especially timely blocking of the writing circuit and resetting of the clock regeneration circuit is possible by means of such an interference detection arrangement.

In a further embodiment of an FM-receiver in accordance with the invention the writing circuit comprises, arranged between the decoding arrangement and the memory circuit, a switching arrangement as well as an error detection circuit connected to the decoding arrangement. The error detection circuit comprises a comparator circuit for mutually comparing one or more corresponding code bits in several consecutive code words connected to a control input of the switching arrangement for blocking the writing circuit in the event of unequal code bits. This control input of the switching arrangement also is connected to the control signal generating circuit.

When this measure is used,. a bit-wise blocking of faulty code bits can be effected below the first interference level by means of the switching arrangement. The repetition of the transmission identification information in iterative, mutually equal code words renders it possible to detect, by means of the comparison circuit, faulty code bits by comparison and also to effect a certain error correction by storing only correct code bits in the memory circuit. The degree of error correction depends on the quality of the error detection, that is to say on the number of comparisons, and also determines the interference level at which decoding errors significantly disturb the reproduction or other processing operations of the transmission identification. Above this so-called first interference level the decoded code signal is disturbed for such a long period of time and so frequently that faulty code bits are no longer recognizable. By continuously blocking the writing circuit these faulty code bits are prevented from being entered into the memory circuit where they might cause noticeable disturbances.

In a still further preferred embodiment of such an FM-receiver in accordance with the invention, the comparison circuit comprises a resettable code bit incrementing circuit for automatically incrementing, after a resetting signal, the number of code bits to be mutually compared. This code bit incrementing circuit is connected to the control signal generation circuit for a resetting operation when the second interference level is passed.

When this measure is used, the number of mutual comparisons of corresponding code bits in consecutive code words is variable, and increases, after a resetting signal from the control signal regeneration circuit, from one code bit per code word in a number of consecutive code words, for example 3 code words, to, for example, 4 bits per code word, writing only being effected when four corresponding code bits in the relevant mutually consecutive code words are equal. Reproduction of the transmission identification can then be effected after recovery of the phase synchronization of the clock signal, followed by a rapid increase in the reliability of the information reproduced, and after a disturbance of only the code signal to maintain a high degree of reliability.

In a further preferred embodiment of such an FM-receiver in accordance with the invention, the signal amplitude and multi-path detector comprises a multiplying circuit having first and second inputs, the first input being connected to an output of the pilot regeneration circuit and the second input being connected to an output of the FM-detection circuit, and an output being connected to the integrator.

When this measure is used, the signal amplitude and the multi-path is measured on the basis of the amplitude and the phase of the relevant pilot, which has a comparatively large amplitude. This results in a particularly reliable measure for both the disturbance of the pilot and the disturbance of the code signal, while in addition a simple implementation of the signal amplitude and multi-path detector is possible.

In a further preferred embodiment of an FM-receiver in accordance with the invention, in the event of an undisturbed reception the signals at the two inputs of the multiplying circuit have mutually equal phases, the integrator having a time constant of 0.7 msec. and the first and second threshold voltages of the threshold circuit deviating in the order of magnitude of 8 dB and 14 dB, respectively from the maximum integrator output voltage.

The invention will now be further described, by way of example, with reference to the Figures.

DESCRIPTION OF THE PREFERRED EMBODIMENT

Figure 1:
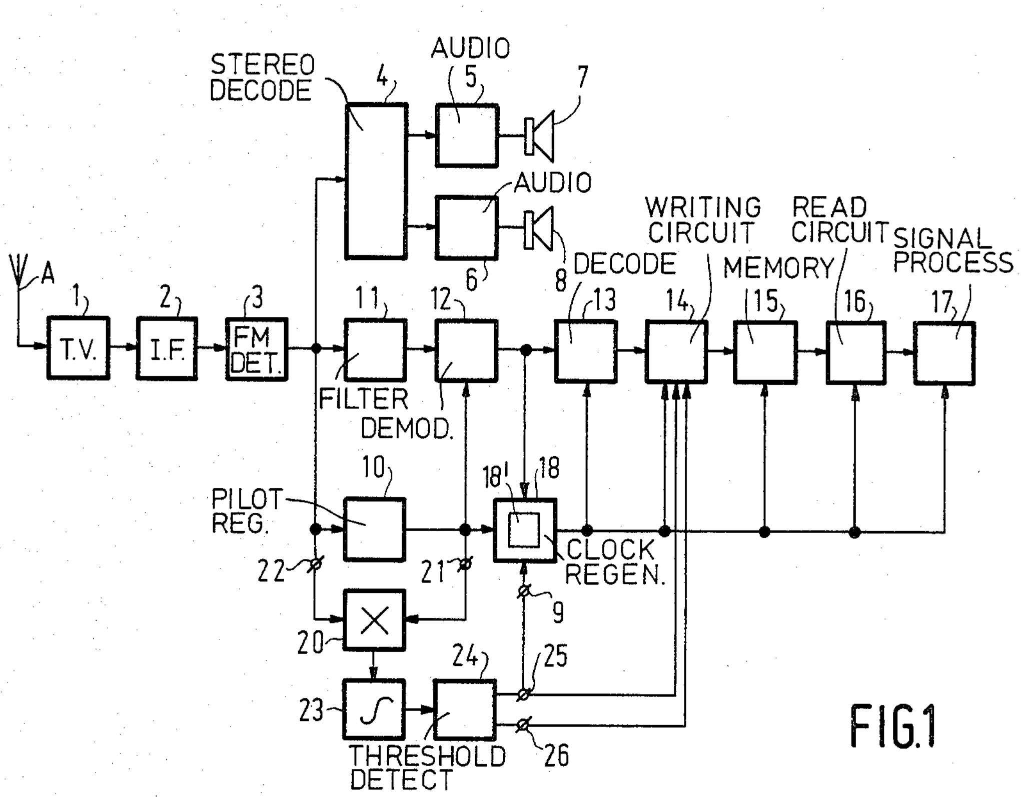
FIG. 1 shows a block diagram of an FM-receiver in accordance with the invention.

FIG. 1 shows an FM-receiver in accordance with the invention which is suitable for the reception of FM-signals with transmission identification and comprises an aerial input having connected thereto a tuning unit 1, to which there are connected, in succession, an IF-unit 2 and FM-detection circuit 3, a stereo decoder 4, audio output stages 5 and 5' and left and right loudspeakers 7 and 8. In said circuits a desired FM-signal is selected in known manner from the signals received at the aerial A and converted into audio-frequency and, possibly, stereophonic sound signals.

The FM-detection circuit 3 produces an FM-multiplex signal, which comprises, in addition to stereophonic or non-stereophonic audio information, a 19 KHz stereo pilot and/or 57 KHz traffic pilot and a code subcarrier which is binary phase-modulated by a code signal. The code signal comprises the transmission identification information to be processed. The frequency of this code-subcarrier is in a given fixed relationship to the stereo pilot frequency $f_p$ and therewith also to the traffic pilot frequency 3 $f_p$, for example $\frac{7}{8}$ $f_p$, 9/8 $f_p$, $2\frac{7}{8}$ $f_p$ or $3\frac{1}{8}$ $f_p$ (16.6125 KHz, 21.375 KHz; 54.625 KHz or 59.375 KHz). The clock signal with which coding of the code signal has been carried out in the transmitter has a frequency which is also in a given fixed relationship to said pilot frequencies, for example 1/32 $f_p$ (594 Hz).

A pilot of the FM-multiplex signal, e.g. the 57 KHz traffic pilot at the output of the FM-detection circuit 3 is applied as a control signal to a phase-locked loop, which functions as a pilot regeneration circuit 10, for regeneration of the traffic pilot. The pilot regeneration circuit 10 may optionally be combined with a stereo pilot regeneration circuit, not shown, included in the stereo decoder for decoding the stereo signal. The code signal-modulated code subcarrier is removed by filtering from the FM-multiplex signal by means of a code filter 11 connected to the FM-detection circuit 3, and is applied to a demodulation arrangement 12 in which demodulation of the code signal is effected. For that purpose the demodulation arrangement 12 is connected to an output of the pilot regeneration circuit 10.

The demodulation binary baseband code signal is thereafter decoded in a decoding circuit 13 connected to the demodulation arrangement 12, that is to say this signal is converted into a digital signal by sampling it at instants determined by a clock signal still to be described. The decoded code signal thus obtained is thereafter stored in a memory circuit 15 by means of a switchable writing circuit 14, which will be further described hereinafter. The stored code signal can be applied to a signal processing unit 17 through a reading circuit 16 connected to the memory circuit 15. By means of the signal processing unit 17 the transmission identification can be optically displayed and/or used, for example, for search tuning, operating a tape recording apparatus or the sound reproduction of the FM-receiver, etc.

In the signal processing operations in the decoding circuit 13, the writing circuit 14, the memory circuit 15, the reading circuit 16 and the signal processing unit 17 a clock signal is used which is regenerated in a clock regeneration circuit 18 connected to the pilot regeneration circuit 10 and the demodulation arrangement 12.

The clock regeneration circuit 18 comprises a resettable phase search circuit 18' and is extensively described in the above-mentioned Netherlands patent application No. 8000607, which has been laid open to public inspection. To understand the invention it is sufficient to mention that the frequency of the clock signal is obtained by frequency division of the (stereo) pilot frequency ($f_{clock}=1/32\ f_p$) and that the phase of the clock signal is statistically determined on the basis of the phase in which the value of the binary baseband code signal changes. This statistical phase determination is carried out by the phase search circuit 18' after a resetting signal has been applied to a resetting input 9 of the clock regeneration circuit 18, after a given phase search period and results in phase synchronization of the clock signal. After this phase synchronization the regenerated clock signal only depends on the (stereo) pilot and interferences in the code signals can no longer disturb the clock signals.

The function of the clock signal during the signal processing operations and also the construction of the decoding circuit 13, the memory circuit 14, the reading circuit 16 and the signal processing unit 17 are sufficiently known and are described in the publication "The SPI system for FM-tuning", published by N. V. Philips' Gloeilampenfabrieken, Electronic Components and Materials Division, 1978, and in the article "Station and Programme identification in FM sound broadcasting" by G. C. M. Gielis, J. B. H. Peek and J. M. Schmidt, published in "Philips Technical Review", Vol. 39, 1980, no. 8, pages 216–225.

The FM-receiver in accordance with the invention also comprises an interference detector 20–26 comprising a mixing stage 20 which operates as a signal amplitude and multi-path detector and to which through a first input 21 the regenerated pilot is applied from the output of the pilot regeneration circuit 10 and also through a second input 22 the received FM multiplex signal, more specifically the relevant pilot thereof, an integrator 23 and a threshold circuit 24 which has first and second output terminals 25 and 26 and functions as a control signal generating circuit.

Figure 2:
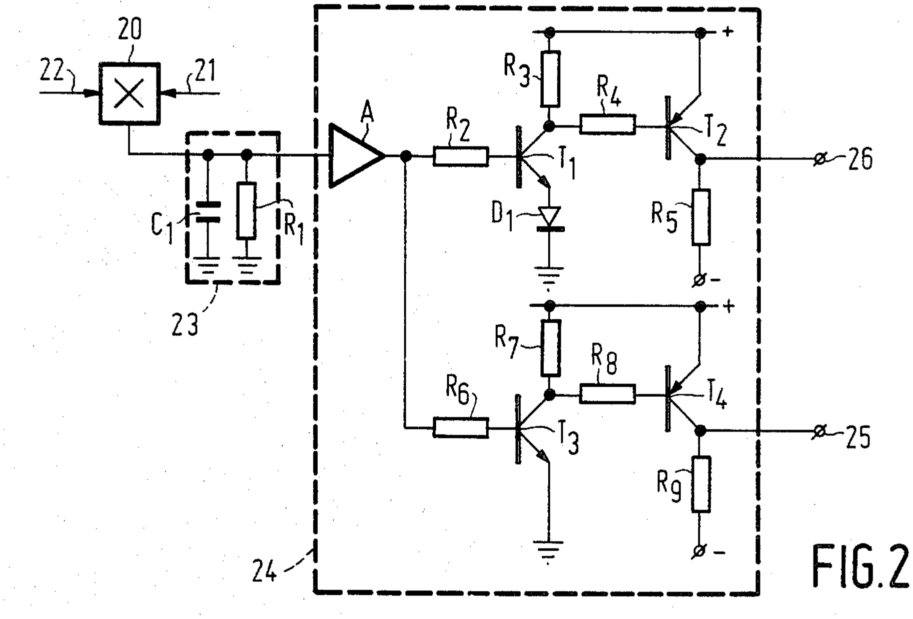
FIG. 2 shows a preferred embodiment of an interference detection circuit and a control signal generation circuit for use in an FM-receiver in accordance with the invention.

FIG. 2 shows a practical embodiment of the circuit 20–26 in which the elements which correspond to the elements of the FM-receiver shown in FIG. 1 have been given the same references. The integrator 23 comprises a parallel RC network $R_1C_1$ having an RC time constant of 0.7 msec. and the threshold circuit 24 comprises two threshold-responsive transistor circuits $T_1$, $T_2$ and $T_3$, $T_4$, which are connected to the output of the integrator 23 by an amplifier A.

The transistor circuit $T_1$, $T_2$ comprises two switching transistors $T_1$, $T_2$, the base of the switching transistor $T_1$ being connected to the amplifier A through a base resistor $R_2$, the collector being connected to a positive supply voltage (5 V) through a collector resistor $R_3$ and also to the base of the switching transistor $T_2$ through a base resistor $R_4$ and the emitter being connected to ground through an emitter diode D. The emitter of the switching transistor $T_2$ is connected to the positive supply voltage and the collector thereof is connected to a negative supply (−6 V) through a collector output resistor $R_5$. The collector of the switching transistor $T_2$ is then also connected to the second output terminal 26.

Switching transistor $T_3$ of the transistor circuit $T_3$, $T_4$ is connected to the output of the amplifier A through a base resistor $R_6$ and to the positive supply voltage through a collector resistor $R_7$. The emitter is connected to ground while the collector is connected to the base of transistor $T_4$ through a base resistor $R_8$. The emitter of the transistor $T_4$ is connected to the positive supply voltage while the collector is connected to the negative supply voltage through a collector output resistor $R_9$ and also to the first output terminal 25.

The integrator 23 and the threshold circuit 24 are dimensioned such that the switching voltage of the transistor $T_1$, that is to say the voltage at which the switching transistor $T_1$ switches from conduction to nonconduction and vice versa, is twice as large as the switching voltage for the switching transistor $T_3$ and amounts to 0.4 of the maximum integrator output voltage (100 mV). This maximum output voltage is reached in the event of an undisturbed reception, the received pilot in question having a maximum amplitude at the same phase as the regenerated pilot.

With brief disturbances of the received pilot, caused for example by multi-path reception and bursts, the amplitude and phase of the regenerated pilot remain substantially unchanged because of the time constant of the phase locked loop which functions as the pilot regeneration circuit 10. The output voltage of the mixer stage 20 is therefore, in the event of disturbances of this type, a reliable measure of the phase and amplitude of the received pilot. When this type of disturbances follow each other rapidly then an integration thereof is effected in the integrator 23, which results in a decrease in the integrator output voltage. Also for disturbances which proceed slowly, for example owing to field strength variations due to geographical circumstances, the signal is for example shielded, the integrator output voltage decreases.

When the integrator output voltage decreases to below the first threshold voltage, that is to say the switching voltage of the switching transistor $T_1$ (40 mV), then this transistor $T_1$ is cut-off, which also holds for the transistor $T_2$. The voltage at the output terminal 26 changes in response thereto suddenly and rapidly from a high to a low value, so that the writing circuit 14 is blocked in a manner to be described hereafter. As the integrator voltage decreases still further then, when the second threshold voltage is passed, that is to say the switching voltage of the transistor $T_3$ (20 mV), this transistor and also the transistor $T_4$, are cut-off. As a result thereof the voltage at the output terminal 25 also changes suddenly and rapidly from a high value to a low value and adjusts the clock regeneration circuit 18 and the writing circuit 14 to the initial state. This initial or reset state is maintained until the integrator output voltage exceeds the second threshold voltage (20 mV).

In a practical embodiment the resistors $R_1$ to $R_9$, inclusive had the values 15 KΩ; 15 KΩ; 3.9 KΩ; 8.2 KΩ; 39 KΩ; 15 kΩ; 3.9 KΩ; 8.2 KΩ; 39 KΩ; respectively; the capacitor $C_1$ had the value 47 nF; the diode $D_1$ was of the type BAX 13 and the transistors $T_1$ to $T_4$, inclusive, were of the types BC 109 (NPN) and BC 179 (PNP).

Figure 3:
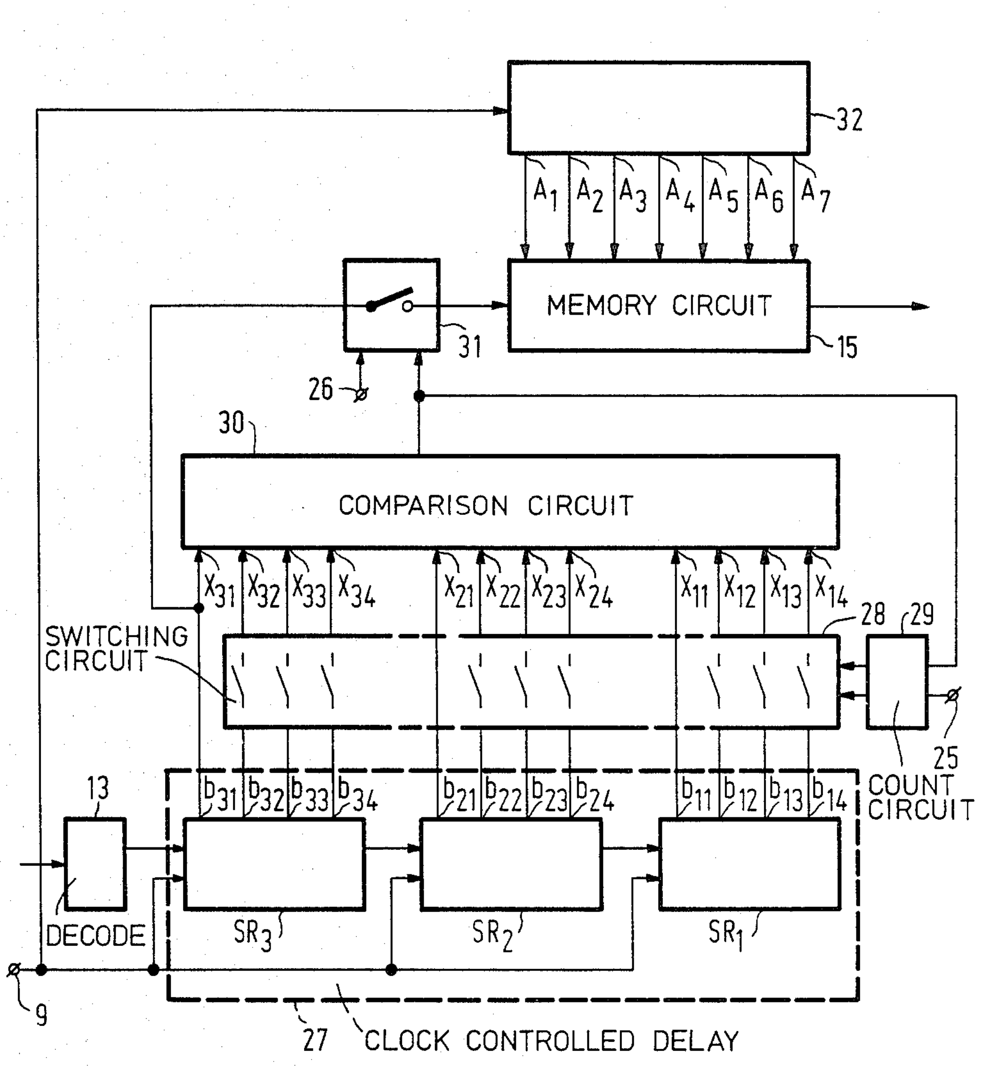
FIG. 3 shows a block diagram of a second embodiment of a writing circuit for use in the FM-receiver of FIG. 1.

FIG. 3 shows by means of a block diagram an embodiment of the writing circuit 14, in which the elements, corresponding to the elements of the preceding Figure have been given the same reference numerals. The writing circuit 14 comprises a clock-controlled delay circuit 27, which is connected to an output of the decoding circuit 13.

The delay circuit 27 comprises three consecutively arranged shift registers $SR_1$ to $SR_3$, inclusive, the shift register $SR_1$ having a length of 4 bits and the shift registers $SR_2$ and $SR_3$ each having a length equal to one code word length (128 bits). The corresponding bit positions of the shift registers $SR_1$-$SR_3$ are separated from each other by one code word length. Four bit positions, the so-called first to fourth bit positions, inclusive of the shift registers $SR_1$-$SR_3$ are connected to outputs $b_{11}$-$b_{31}$; $b_{12}$-$b_{32}$; $b_{13}$-$b_{33}$ and $b_{14}$-$b_{34}$, respectively, of the delay circuit 27. The outputs $b_{11}$-$b_{31}$, that is to say the first bit positions of the shift registers $SR_1$ to $SR_3$ inclusive, are directly connected to inputs $X_{11}$-$X_{31}$ of a comparison circuit 30, which serves as an error detection circuit, while the remaining outputs $b_{12}$-$b_{32}$, $b_{13}$-$b_{33}$ and $b_{14}$-$b_{34}$, that is to say the second to fourth bit positions, inclusive of the shift registers $SR_1$ to $SR_3$, inclusive are connected to inputs $X_{12}$-$X_{32}$, $X_{13}$-$X_{33}$ and $X_{14}$-$X_{34}$, respectively of the comparison circuit 30 through a controllable switching circuit 28. An output of the comparison circuit 30 is connected to a control input of a controllable switching arrangement 31 arranged between the first bit position ($b_{31}$) of the shift register $SR_3$ and a code input of the memory circuit 15 and serving as a writing circuit, and is also connected to a counting input of a counting circuit 29, which serves as a resettable incrementing circuit. The counting circuit 29 is connected to the switching circuit 28 and has a resetting input which is connected to the output terminal 25 of the control signal generating circuit 24.

In the reset position of the counting circuit 29 only the bit positions of the shift registers $SR_1$ to $SR_3$, inclusive are connected to the comparison circuit 30 and this comparison circuit generates a termination or write signal when there is mutual agreement between the bit values. Consequently, the bit value in the region of $b_{31}$ is written by a next clock pulse into the memory circuit 15 in a bit position indicated at address outputs $A_1$-$A_7$ of address counter 32, which is connected to the memory circuit 15. In addition, the counting position of the counting circuit 29 is incremented by one.

When the bit values in the so-called first bit positions ($b_{11}$-$b_{31}$) have mutually different values, the controllable switching arrangement 31 is blocked and no bit value or a predetermined fixed bit value is written into the memory position indicated by the address counter 32. The counting position of the counting circuit 29 then remains unchanged.

This signal processing operation is repeated for the subsequent bits of the code signal until the counting circuit 29 reaches counting position 15.

At the subsequent incrementation of the counting position the second bit positions ($b_{12}$-$b_{32}$) are connected to the comparison circuit 30 and a further incrementation of the counting position is realized and a termination or write signal is generated only when both the mutual bit values in the first bit positions and those in the second bit positions are equal. This increases the reliability of the error detection. When the counting position reaches the counting position 32, the reliability of the error detection position is again increased as the comparison is extended to 3 bits per word. In the ultimate counting position 4 a very high reliability of the error detection is obtained as the comparison is then on the basis of 4 bits per word.

For a given signal quality, that is to say for a given bit error probability, the reliability of the stored bit information is at the cost of the rate of storage. By controlling, in the above-described manner, the degree of reliability in dependence on the signal quality, an optimum ratio is obtained between the rate of storage, that is to say the rate at which the information is available, for example, for optical display and the reliability of the stored information for different values of the bit error probability.

The switching arrangement 31 has a further control input terminal which is connected to the output terminal 26 of the control signal generation circuit 24. When the integrator output voltage decreases to below the said first threshold voltage, then the switching arrangement 31 is blocked by the output terminal 26 and as a result thereof also writing code bits into the memory circuit 15 is blocked. However, the code bits already stored in the memory circuit 15 remain available for further processing, for example for optical display.

When the integrator output voltage decreases still further to below the second threshold voltage, then the counting circuit 29 and the clock regeneration circuit are reset to their initial position by the output terminal of the control signal generation circuit 24. Then also the information stored in the memory circuit can optionally be erased and/or reading the memory circuit be temporarily blocked. After synchronization of the regenerated clock signal a further incrementation of the counting position of the counting circuit 29 then follows and thereby, as described above, an increase in the reliability of the information stored in the memory circuit 15.

For a person skilled in the art it will be obvious how the circuit shown can be realized, for example by means of the integrated circuits HEF 4024, 4027, 4071, and 4081 (for the controllable switching circuit 28 and the resettable counting circuit 29), integrated circuit HEF 4081 (for the switching arrangement 31), the integrated circuit HEF 4024 (for the address counter 32), the integrated circuit HEF 4585 (for the comparison circuit 30) and the integrated circuit HEF 4720 (for the memory circuit 15).

It will be obvious that the invention is not limited to the embodiment shown. It is, for example, very well possible to employ the inventive idea by using another prior art interference detection arrangement which is known per se and is described in, for example, German patent application No. 2929647, which has been laid open to public inspection, or a different error correction, for example an error correction based on the so-called cyclic redundancy check, before effecting storage in the memory circuit 15, and/or by keying the pilot regeneration circuit to another pilot when the before-mentioned stereo or traffic pilot, which is possible when the frequency of said other pilot also has a fixed relationship with the clock frequency of the code-signal and the frequency of the code subcarrier.

What is claimed is:

1. An FM receiver for receiving an FM signal containing a transmission identification code of the type having an aerial input connected to a tuning unit, coupled to the combination of an IF unit, FM detector, pilot regeneration circuit and a demodulation circuit for demodulating said identification code, a circuit for processing said demodulated identification code comprising:

- a clock regeneration circuit connected to said pilot regeneration circuit and said demodulation circuit which includes a resettable phase search circuit for producing a clock signal the frequency of which is derived from a regenerated pilot signal and the phase of which is derived from the demodulated code signal;
- a clock controlled decoding circuit for decoding the code signals;
- a switchable writing circuit for writing said code signals into a memory circuit;
- a memory for receiving said decoded code signals as memory contents;
- a reading circuit for reading the contents of said memory;
- a signal unit connected to receive said read out memory contents controlled by said clock signal; and
- interference detection means for detecting interference levels of a first and second level, said interference detector means having a control signal generation circuit connected to inhibit said writing circuit when an interference level of said first level is detected and resetting the clock regeneration circuit when interference levels of said second level are received, said first interference level being lower than said second interference level at which noticeable decoding errors occur, the second interference level being substantially equal to the interference level at which a phase slip of the clock signal occurs.

2. An FM-receiver as claimed in claim 1, wherein the interference detection means comprises a signal amplitude and multi-path detector which is connected through an integrator to a threshold circuit which is included in the control signal generation circuit and has first and second threshold voltages which correspond to the first and second interference level, respectively, the integrator output voltage blocking the writing circuit when the first threshold voltage is passed and resetting the clock regeneration circuit when the second threshold voltage is passed.

3. An FM-receiver as claimed in claim 1, wherein the writing circuit comprises, connected between the decoding circuit and the memory circuit a switching circuit as well as an error detection circuit connected to the decoding circuit and comprising a comparison circuit for mutually comparing one or more corresponding code bits in several consecutive code words and being connected to a control input of the switching circuit for blocking the writing circuit in the extent of unequal code bits, said control input of the switching circuit also being connected to the control signal generation circuit.

4. An FM-receiver as claimed in claim 1 or 2, wherein the writing circuit comprises an error correction circuit, being connected between the decoding circuit and the memory circuit, for a correction of bit-errors based on the cyclic redundancy check.

5. An FM-receiver as claimed in claim 3, wherein the comparison circuit comprises a resettable incrementing circuit for automatically incrementing on receipt of a resetting signal the number of code bits to be mutually compared, this incrementing circuit being connected to the control signal generation circuit for a resetting operation when the second interference level is exceeded.

6. An FM-receiver as claimed in claim 2 the signal amplitude and multi-path detector comprises a multiplying circuit having first and second inputs, the first input being connected to an output of the pilot regeneration circuit and the second input being connected to an output of the FM-detector, and an output being connected to the integrator.

7. An FM-receiver as claimed in claim 6, wherein during an undisturbed reception the signals at the two inputs of the multiplying circuit have mutually equal phases, the integrator has a time constant of 0.7 msec. and the first and second threshold voltages of the threshold circuit deviate from the maximum integrator output voltage by a value of the order of magnitude of 8 dB and 14 dB, respectively.

* * * * *